United States Patent Office 3,150,569
Patented Sept. 29, 1964

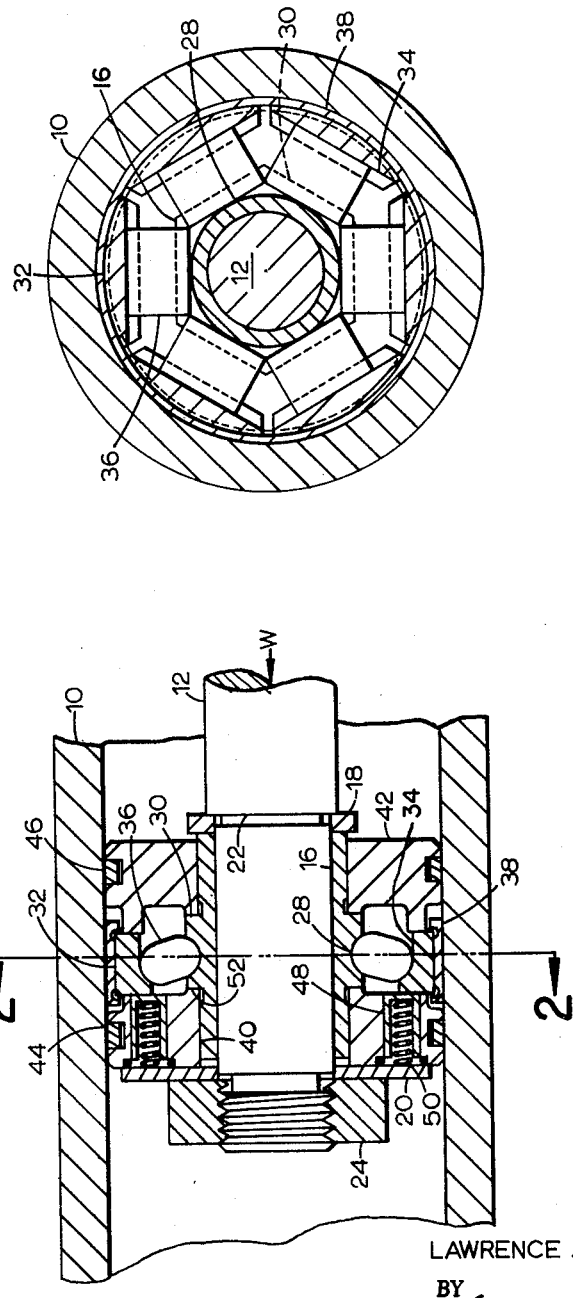

3,150,569
PISTON MECHANISM
Lawrence A. Attermeyer, Cincinnati, Ohio, assignor to The Cincinnati Milling Machine Co., Cincinnati, Ohio, a corporation of Ohio
Filed Mar. 4, 1963, Ser. No. 262,642
2 Claims. (Cl. 92—14)

This invention relates to a piston mechanism for use in a fluid motor, and it is particularly adapted to stop movement of the piston in a cylinder when a loss of fluid pressure occurs.

In many machine tools today, large members of considerable mass are moved in other than horizontal directions and as a result a large force exists which tends always to move the member downward. It is a frequent practice to apply counterweight mechanisms to these machines to oppose the force of gravity on the movable member, but these counterweight mechanisms seldom exactly balance the member to such an extent that the member would remain in an elevated position upon a loss of fluid pressure in a piston and cylinder motor connected to elevate the member. It is also a popular practice to use hydraulic motors to counterbalance machine members which are moved by other motors, and a loss of fluid pressure in such machines would result in the complete loss of the counterweight force and would allow the member to settle downward. These losses of fluid pressure may be occasioned, for example, by broken fluid lines or sudden power failures, and their occurrence is unpredictable. It might also be desirable to stop the machine with a ram in an elevated position and have it remain there after the machine is stopped for a period.

It is therefore an object of this invention to provide a piston construction for use in machines for raising members to elevated positions which is such that the piston will stop itself in its cylinder when a sudden stoppage occurs in the supply of fluid under pressure thereto.

It is also an object of this invention to provide a piston construction which will lock itself against downward movement upon a loss of the fluid pressure supply thereto and in which the forces resisting downward movement are directly related to the forces tending to cause the downward movement.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form, the piston construction of this invention utilizes a radially expanding member to grip the wall of the cylinder bore when an uncontrolled falling condition of the piston exists. The piston is provided with a clutch mechanism which operates in a spragging manner to expand the member outward against the bore wall. The expanding member spreads the pressure of the spragging mechanism over a considerable area of the bore wall to prevent peening or outward bulging of the cylinder. A clear understanding of the construction and operation of this invention can be obtained from the following detailed description in which reference is made to the attached drawings wherein:

FIG. 1 is a longitudinal section of a piston mechanism.
FIG. 2 is a section of the piston of FIG. 1 on line 2—2.

As shown in FIG. 1, a cylinder 10 slidably receives a piston mechanism which is attached to a piston rod 12 to which a loading mechanism (not shown) is connected and which constantly produces a force represented by the arrow W tending to move the piston rod 12 leftward as viewed in the drawing. The force W may be produced, for example, by the weight of the rod 12 and a mass attached thereto if the cylinder 10 is longitudinally oriented in the vertical direction with its right end uppermost. The piston mechanism includes a sleeve 16 which is received over the end of the piston rod 12 for movement therewith. The sleeve 16 is retained on the end of the rod 12 between a ring 18 and disc 20. The ring 18 is adapted to engage a shoulder 22 on the rod 12 when moved rightward, as viewed in FIG. 1, while the disc 20 is retained on the rod 12 by engagement with a nut 24 threaded onto the left end of the rod 12. A concave groove 28, shown in FIGS. 1 and 2, is formed around the periphery of the middle section 30 of the sleeve 16. A set of shoe members 32 are received in the space between the middle section 30 and the cylinder 10, and each of these has a concavely formed notch 34 extending thereacross and opposite to the groove 28 of the sleeve 16. The spragging members of the piston mechanism are a set of toggle members 36 received between the groove 28 and the notches 34 and each of the toggle members 36 is convexly shaped along opposite sides for pivotal receipt therebetween. An expansible ring member 38 is received directly between the shoes 32 and the cylinder 10. A pair of annular piston face members 40, 42 are received around the sleeve 16 to embrace the toggle members 36, shoes 32 and ring 38 therebetween. Each of these carries a piston ring 44, 46, respectively, slidably engaged in the bore of the cylinder 10. The face member 40 is in tight engagement between the disc 20 and a shoulder 52 on the sleeve 16 such that the face member 40 as well as the sleeve 16 move with the rod 12. The face member 40 has a series of movable plungers 48 spaced therearound and each of these plungers has a spring 50 compressed against the disc 20 to force the plungers 48 against the shoes 32 which then are biased to move toward the other face member 42. This tends to rotate the toggle members 36 counter-clockwise as viewed in FIG. 1. The spacing between the grooves 28, 34 will not permit the toggle members 36 to pivot further in that direction, and the toggle members 36 are maintained in an incipient wedging condition.

The members of the piston mechanism are in the relative positions described during normal operation of the mechanism. To move the piston rod 12 toward the right, fluid under pressure is applied against the end of the rod, the disc 20 and face member 40. The other face member 42 is subjected to a low fluid pressure. A part of the force created by this pressure differential is transmitted directly to the end of the piston rod 12 and to the nut 24. The force produced on the disc 20 and face member 40 is transmitted through the engagement of the member 40 at the shoulder 52 on the middle section 30 to the sleeve 16 and from there it is transmitted to the piston rod 12 by the engagement of the sleeve 16 with the ring 18 and the ring 18 with the shoulder 22 of the rod 12. Therefore, the force W is overcome and the piston rod 12 moves toward the right as viewed in FIG. 1. Under these conditions the toggle members 36 cannot change their angular position and no excessive drag will be applied between the expanding ring 30 and cylinder 10.

To move the piston rod 12 toward the left under normal operating conditions, a reduced but substantial back pressure is maintained on the exposed surfaces of the disc 20, member 40, nut 24 and end of the rod 12 which tends to hold the piston mechanism members in the relation described and controls the rate of movement back to the left. At the same time fluid under pressure can be applied to the other side at the exposed surface of the member 42 to create a force transmitted through the shoes 32 to the member 40 and from there to the disc 20, nut 24 and rod 12 to force the rod 12 rapidly leftward in the cylinder 10 as viewed in FIG. 1 against the described back pressure. In either case, no condition exists to cause the toggle members 36 to pivot and expand the ring 38 and therefore no locking drag is produced to stop the piston mechanism from moving. The method of applying the fluid pressure differentials here described is not shown since it is within the skill of the art to provide a fluid control circuit utilizing conventional and well known hydraulic valve devices which will provide the described fluid pressure differentials between the cylinder spaces.

If the fluid under pressure is removed completely from the left side of the piston mechanism as by a fluid line break, for example, the force W acts directly on the rod 12 to move it leftward as shown in FIG. 1. The retaining ring 18 then tends to carry the sleeve 16 leftward with the rod 21 relative to the shoes 32 and expansible ring 38. When this happens, the sleeve 16 causes the toggle members 36 to rotate counter-clockwise to produce a force expanding the shoes 32 and ring 38 outward and creating a drag against the cylinder 10. This drag will increase until the resistive force opposing the movement of the rod 12 and the force W are counterbalanced and the rod is stopped. Very little movement of the sleeve 16 is required before the drag stops the piston mechanism since the spring 50 and plunger 48 hold the mechanism on the verge of clamping at all times during normal operation. The greater the force W, the greater will be the drag produced by the toggle members 36, the shoes 32 and the ring 38.

What is claimed is:

1. In a fluid motor having a piston rod movable relative to a cylinder, said rod having a load force acting thereon constantly tending to shift the rod in one direction in the cylinder, a piston mechanism on the rod comprising:
   (a) a pair of piston face members received around the rod and dividing the cylinder into two fluid cavities isolated from one another, one of said face members fixed to said rod for axial movement therewith and the other of said face members movable a limited amount relative to said rod,
   (b) a radially expansible member received around and spaced from the rod proximate to said cylinder and loosely between said face members,
   (c) a sleeve fixed on said rod between said face members and axially movable with said rod,
   (d) a set of toggle members pivotally received between said sleeve and said expansible member, said toggle members rotatable by said sleeve to increase the spacing between said sleeve and expansible member when the rod moves in said one direction relative to said expansible member, and
   (e) a spring bias mechanism received in said one face member tending to move said expansible member away therefrom in the other direction relative to said one direction, said expansible member thereby rendered movable with said rod in said one direction only when a force acts on said one face member to oppose the load force.

2. In a fluid motor having a piston rod movable relative to a cylinder, said rod having a load force acting thereon constantly tending to shift the rod in one direction in the cylinder, a piston mechanism on the rod comprising:
   (a) a pair of piston face members received around the rod and dividing the cylinder into two fluid cavities isolated from one another, one of said face members movable a limited amount relative to said rod,
   (b) a radially expansible member received around and spaced from the rod proximate to said cylinder and loosely between said face members,
   (c) a set of shoe members seated in said expansible member and movable along the cylinder therewith,
   (d) a sleeve fixed on said rod between said face members and axially movable with said rod,
   (e) a set of toggle members between said sleeve and said shoe members, each of said toggle members pivotally received at one end in said sleeve and at the other end thereof in one of said shoe members, said toggle members rotatable by said sleeve to increase the spacing between said sleeve and expansible member when the rod moves in said one direction relative to said expansible member, and
   (f) a set of plungers received in said one face member and having springs compressed therein urging said plungers against said shoe members to move said shoe members and expansible member in said other direction relative to said rod whereby said toggle members are rotated to an incipient clamping condition and said rod is movable in said one direction only when a force acts on said one face member to oppose the load force.

References Cited in the file of this patent

UNITED STATES PATENTS

| 1,063,598 | Richards et al. | June 3, 1913 |
| 2,259,815 | Greve | Oct. 21, 1941 |
| 2,364,715 | Horton et al. | Dec. 12, 1944 |

FOREIGN PATENTS

| 554,492 | Canada | Mar. 18, 1958 |